(12) United States Patent
Dimou et al.

(10) Patent No.: US 9,680,627 B2
(45) Date of Patent: Jun. 13, 2017

(54) USER STATION SUPPORTING A COMMUNICATION SERVICE AND METHOD FOR SELECTING DUPLEX MODE FOR THE SERVICE

(71) Applicant: Intel Corporation, Santa Clara, CA (US)

(72) Inventors: Konstantinos D. Dimou, San Francisco, CA (US); Ehsan Aryafar, Kensington, CA (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 14/317,065

(22) Filed: Jun. 27, 2014

(65) Prior Publication Data

US 2015/0382207 A1     Dec. 31, 2015

(51) Int. Cl.
*H04W 24/02*     (2009.01)
*H04L 5/14*      (2006.01)
*H04W 56/00*     (2009.01)
*H04W 92/10*     (2009.01)

(52) U.S. Cl.
CPC ............... *H04L 5/14* (2013.01); *H04W 24/02* (2013.01); *H04W 56/006* (2013.01); *H04W 92/10* (2013.01); *H04L 5/143* (2013.01); *H04L 5/1469* (2013.01); *H04W 56/0005* (2013.01)

(58) Field of Classification Search
CPC .......... H04L 5/14; H04W 24/02; H04W 84/12
USPC ......................................................... 370/280
See application file for complete search history.

(56) References Cited

U.S. PATENT DOCUMENTS

| | | | | |
|---|---|---|---|---|
| 2009/0296609 A1* | 12/2009 | Choi | .................... | H04W 72/121 370/281 |
| 2011/0103499 A1* | 5/2011 | Cheng | ................ | H04W 56/0005 375/260 |
| 2014/0169234 A1* | 6/2014 | Zhu | ..................... | H04W 72/082 370/277 |

* cited by examiner

*Primary Examiner* — Jae Y Lee
*Assistant Examiner* — Jean F Voltaire
(74) *Attorney, Agent, or Firm* — Schwegman Lundberg & Woessner, P.A.

(57) ABSTRACT

Embodiments of a system and method for selecting a duplex mode for a service operating in a Wireless Network are generally described herein. In some embodiments, a mobile device may receive one or more traffic packets related to an establishment or a re-establishment of a service at the mobile device, and may select a duplex mode for the service. In some embodiments, the mobile device may be an IEEE 802.11 Station (STA). The mobile device may be configured to select full-duplex as the duplex mode when a delay requirement associated with the service is less than a predetermined delay threshold and when a calibration overhead associated with the mobile device or the service is less than a predetermined calibration overhead threshold. In addition, the mobile device may also be configured to select time-division duplex (TDD) or frequency-division duplex (FDD) as the duplex mode when the delay requirement is less than the delay threshold and when the calibration overhead is less than the calibration overhead threshold.

29 Claims, 4 Drawing Sheets

FIG. 4

USER STATION SUPPORTING A COMMUNICATION SERVICE AND METHOD FOR SELECTING DUPLEX MODE FOR THE SERVICE

TECHNICAL FIELD

Embodiments pertain to wireless communications. Some embodiments relate to wireless networks or mobile devices configured to operate in accordance with versions of the IEEE 802.11 or 3GPP standards. Some embodiments pertain to wireless networks or mobile devices that support bi-directional communication services.

BACKGROUND

A mobile device may be capable of supporting various bi-directional data services that enable it to receive and send data to other devices or components. Due to their nature or functionality, these services may have different requirements for typical parameters like the data rate and latency. For example, a text messaging service may be considered a low data rate service that does not require low latency while a real-time gaming service, in contrast, likely requires a much higher data rate and a very low latency. Such requirements can be important factors in the choice of the duplex mode for the service, which defines how the device utilizes important system resources, such as frequency spectrum and time, in order to both receive and send data related to the service.

Some of the well known duplex modes like time-division duplex (TDD) and frequency-division duplex (FDD) may be used in these data services. The services may also use another technique called "full-duplex," which has received considerable attention recently due to its potential to provide improved latency and data rate performance in comparison to other duplex modes. However, full-duplex also may cause issues or problems, including interfering with neighboring devices in close proximity. In addition, the use of full-duplex may negatively impact the battery life of the mobile device and may require an unreasonable amount of self-calibration. Thus there are general needs for systems and methods for choosing to use full-duplex for a service, and in general for selecting a duplex mode for the service.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device can be a user station (STA) configured to operate in accordance with at least one version of the IEEE 802.11 standard. In some embodiments, the mobile device may include one or more of a keyboard, a display, a non-volatile memory port, multiple antennas, a graphics processor, an application processor, speakers, and other mobile device elements. The display may be an LCD screen including a touch screen.

Figure 1:
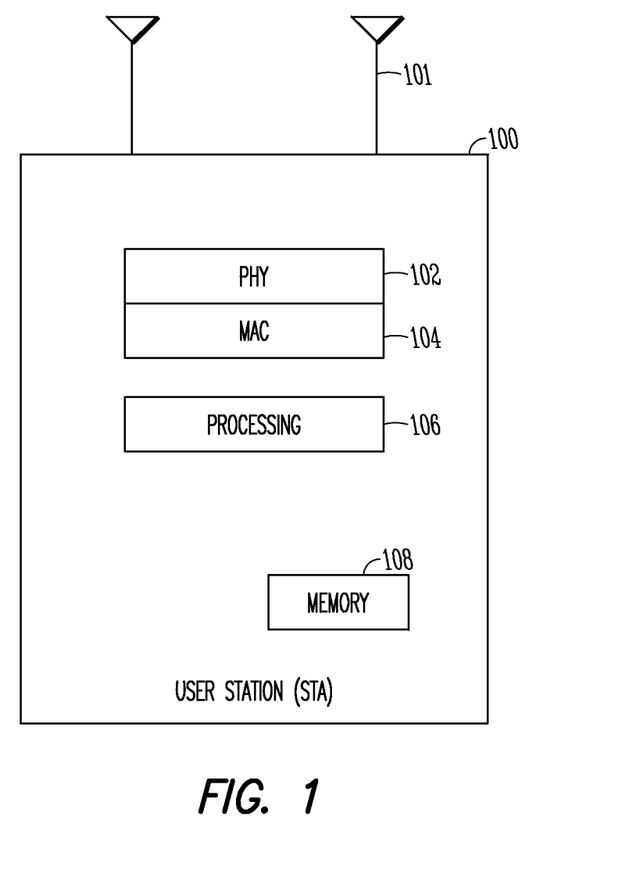
FIG. 1 is a functional diagram of a user station (STA) in accordance with some embodiments.

FIG. 1 is a block diagram of a mobile device/user station (STA) in accordance with some embodiments. The STA 100 may include physical layer circuitry 102 for transmitting and receiving signals to and from Access Points (AP's), other STA's or other devices using one or more antennas 101. STA 100 may also include medium access control layer (MAC) circuitry 104 for controlling access to the wireless medium. STA 100 may also include processing circuitry 106 and memory 108 arranged to perform the operations described herein.

The antennas 101 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 101 may be effectively separated to take advantage of spatial diversity and the different channel characteristics that may result.

Although the STA 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the STA 100 may be configured to operate in an IEEE 802.11 network in accordance with a duplex mode. In these embodiments, the user station 100 may be configured to receive one or more traffic packets related to an establishment or a re-establishment of the service at the STA 100. When a delay requirement associated with the service is less than a predetermined delay threshold, the user station 100 may select full-duplex as the duplex mode when a calibration overhead associated with the STA 100 or the service is less than a predetermined calibration overhead threshold, and may select time-division duplex (TDD) or frequency-division duplex (FDD) as the duplex mode when the calibration overhead is not less than the calibration overhead threshold. These embodiments are described in more detail below. It is noted here that for the sake of illustration, some of the disclosed examples focus on devices operating in an IEEE 802.11 network. However, the subject matter disclosed is not limited to those devices or to IEEE 802.11 networks, and may be applied to other suitable types of devices, wireless networks or systems using any suitable radio interface, which may be different from the radio interface(s) associated with IEEE 802.11 specifications. As an example, methods and subject matter disclosed herein may be applied to devices and networks configured to operate according to 3GPP standards or other IEEE standards. In addition, methods and subject matter disclosed herein may be applied to devices and networks configured to operate according to evolutions of IEEE 802.11 standards, 3GPP standards or other IEEE standards.

Figure 2:
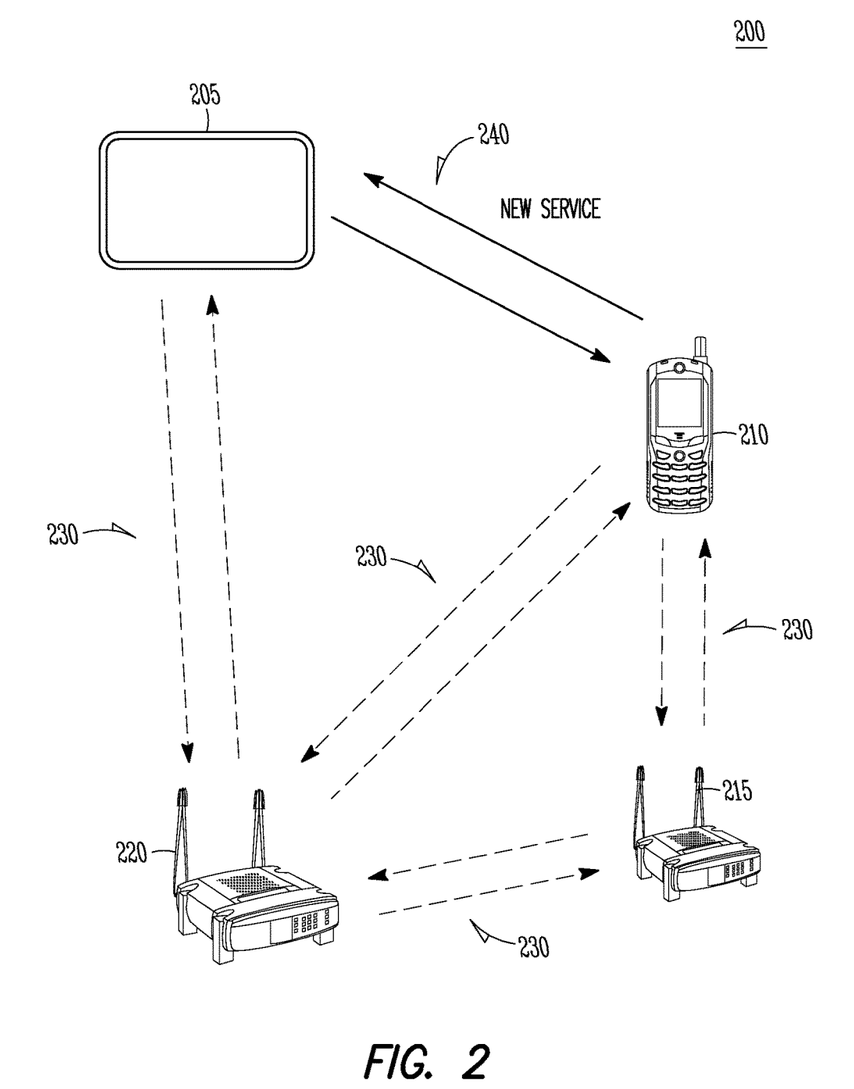
FIG. 2 is a block diagram of a system that supports mobile devices or access points in accordance with some embodiments.

Referring to FIG. 2, an example of a system 200 that may support embodiments disclosed herein is shown, which includes several mobile devices 205, 210, and 215, some of which are in communication with each other or with an access point 220. The mobile devices 205, 210, 215 may be examples of the user station 100 shown in FIG. 1, and are renumbered in FIG. 2 for clarity in the discussion below. The communication links 230 and 240 between devices 205, 210, 215 may be "device-to-device" links, which may take place with or without the involvement or presence of a network or controlling node. In addition, the number of devices 205, 210, 215 and access points 220 and the number and type of communication links supportable by and between them are not limited to the number shown in FIG. 2. The communication links 230, 240 may take place using any suitable wireless protocol, and may be performed in licensed or unlicensed spectrum, which may or may not be contiguous in frequency.

An issue that is addressed in embodiments disclosed herein is the selection of a duplex mode for a service operating at a mobile device or access point such as 205, 210, 215 or 220, an issue that is especially interesting for the system 200 (or other such systems), in which a new service is to be established over the link 240 between the mobile devices 205 and 210. The link 240 is demarcated with a thick line to indicate that it is in the process of being established or re-established, and that its duplex mode needs to be selected. The other links 230 between other devices are indicated with dotted lines, and are assumed in this example as already established and operational. It should be noted that the double arrow associated with each link 230, 240 indicates that it is bi-directional. Discussion below will be from the perspective of the mobile device 205 establishing the link 240, for purpose of simplicity only.

Several duplex modes are available to support the bi-directional link 240, including TDD or FDD, techniques well known in the art. In addition, a technique referred to as "full-duplex" has recently received considerable attention as a duplex mode option, due to its potential benefits in both latency and data rate. It should be pointed out that the term "full-duplex" as used herein refers to a duplex mode employed at the device 205 in which one or more antennas at the device 205 transmit data-bearing wireless signals while one or more different antennas at the device 205 receive data-bearing wireless signals, with the transmission and reception performed in the same frequency spectrum during the same time period. In contrast, TDD refers to a duplex mode in which transmission and reception are performed in the same frequency spectrum, but during different non-overlapping time periods. FDD refers to a duplex mode in which transmission and reception are performed during the same time period, but in different non-overlapping frequency spectra.

While all of these duplex modes (or additional ones not mentioned herein) may be employed to enable bi-directional communication over a link such as 230 or 240, there are performance and resource trade-offs to consider when a selection of duplex mode is made, as known in the art. An exhaustive discussion of those trade-offs will not be presented herein, but it is worth mentioning that full-duplex may be of particular interest for situations that require low latency or high data rates. In comparison to TDD, for example, the fact that transmission and reception can be performed essentially at the same time in full-duplex mode may enable the mobile device 205 to transmit a response to a received block of data much more quickly in full-duplex mode than in TDD mode, thus reducing latency. In addition, full-duplex mode enables both the transmit and receive sides to utilize the frequency spectrum for an entire time period while TDD operation can only allow transmission (or reception) during a portion of the time period. Accordingly, full-duplex provides increased data rates in comparison to TDD, which can also provide a further improvement in latency compared to TDD, as the required time to send a block of data of a particular size is lower.

The required latency associated with a service may be the maximum allowable time period that can elapse between a transmission of data from the mobile device 205 and the decoding of a response to the transmission from another device. However, the term "latency" may also refer to any other suitably defined quantity related to delay, as known in the art. The actual latency of the service may depend on several factors, including, but not limited to, the communication channel, traffic congestion, priority of the service, and the duplex mode. It is possible that when the actual latency is greater than the required latency, the functionality of the service may be degraded or even impossible. As an example, a service that requires a round trip delay below a cutoff value of five milliseconds may be considered "low-latency."

A required data rate for the service may be a minimum data rate that needs to be received at or transmitted from the mobile device 205 in order for the service to function at a desired level of performance. Accordingly, the service may have required data rates for both receive and transmit sides, which may be different or the same. In cases in which the two rates are the same, the service may only specify a required data rate with the understanding that it applies to both receive and transmit sides. As disclosed herein, it is understood that a required data rate, a data rate threshold or the like may refer to received data or transmitted data or both together. As an example, a cutoff value of 100 Mbits/sec may be used such that services requiring a data rate higher than that value are considered high data rate.

Although full-duplex may provide latency or data rate advantages over TDD or FDD, it also may bring challenges and detrimental effects to the system 200 and to the mobile device 205 employing it. One such issue is that various types of self-calibration processes at the mobile device 205 may be necessary in order to employ full-duplex for the service, and those processes generally require overhead. An example of a self-calibration process that may be required is the cancellation or mitigation of self interference in the transmitter and receiver chain. Due to the fact that the mobile device 205 transmits on the same frequency on which it receives, there may be a large amount of self-interference from the transmit antenna(s) that feeds back into the receive antenna(s), which can be alleviated using self-interference calibration methods, as known in the art. In some embodiments, the transmission of actual data is paused in order to transmit known training data in TDD mode for a time period, during which a measurement or estimation of the feedback channel can be determined. In any case, the amount of overhead required for self-calibration of the device 205 will be referred to herein as the "calibration overhead."

With respect to selecting the duplex mode for the service, the actual (or estimated) calibration overhead may be determined in any suitable manner. As a non-limiting example, during a self-calibration process, the required time or amount of training data required may give an indication to the required calibration overhead. This quantity may be compared, in some embodiments, with a calibration overhead threshold, which may be determined as part of a system design or may be specified as part of the service. The calibration overhead threshold may be a percentage or length of time during which the calibration may need to be performed or any other suitable quantity. As an example, a calibration overhead threshold of 10% may be used, and values above that range may be considered excessive.

Another issue associated with the use of full-duplex is interference that may be caused to neighboring devices. As an example, in the system 200, the mobile device 205 transmitting to the mobile device 210 in full-duplex mode over the link 240 may cause unwanted interference to the mobile device 215 or the access point 220. The level of interference associated with full-duplex may be excessive in comparison to the level caused by the use of TDD or FDD, and must be taken into account when selecting the duplex mode. The full-duplex interference level may include or be based on any suitable information, including a power level transmitted by the mobile device 205 or a frequency range or time period over which significant interference is generated. In some embodiments, the full-duplex interference level may be determined such that it characterizes how much a full-duplex connection can interfere with neighboring devices or access points such as 215 or 220. As part of a system design, a corresponding threshold may be determined such that a full-duplex interference level above that threshold is considered excessive. It should also be pointed out that the mobile device 205 itself may have multiple communication sessions operating which could also be negatively affected by the use of full-duplex in one of those sessions.

An additional issue associated with the use of full-duplex at the mobile device 205 is the possibility of negatively affecting the battery life of the device 205. Due to the simultaneous transmission and reception of signals on the same frequency spectrum or other configurations or associated challenges, the use of full-duplex may be more taxing on the battery than would the use of other duplex modes. Accordingly, a battery level of the mobile device 205 may need to be monitored, and the use of full-duplex may be employed, in some embodiments, only when the battery level is above a predetermined battery level threshold. Such a threshold may be determined as part of a system design or hardware analysis.

Another consideration related to the use of full-duplex at the mobile device 205 is the ability of the device 205 to realize a necessary level of performance (such as packet error rate and data throughput) while in full-duplex mode. This may be especially challenging in the presence of interference, particularly full-duplex interference from neighboring devices. As an example, the mobile device 205, while communicating in full-duplex mode over the link 240, may experience interference caused by the mobile device 215 or the access point 220. As such, the mobile device 205 may request that the mobile device 215 lower or monitor its transmit power, or may request that the mobile device 215 not utilize full-duplex in its own communication links 230. Such a request may be made directly to the other mobile device 215, to the access point 220 for announcement to the system 200, or in any other suitable manner.

Figure 3:
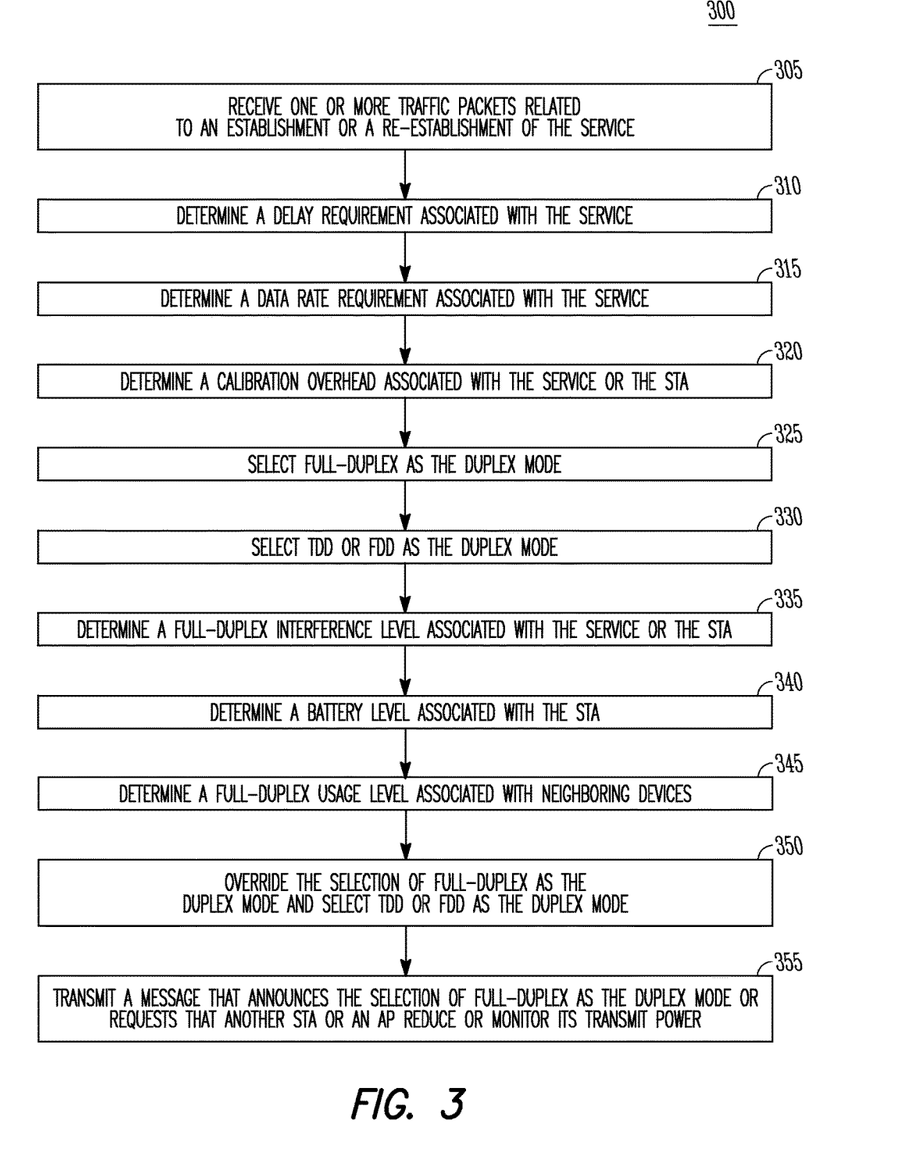
FIG. 3 illustrates the operation of a method for selecting a duplex mode in accordance with some embodiments.

Referring to FIG. 3, a method 300 of selecting a duplex mode for a service at an IEEE 802.11 Station (STA) is shown. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4, although it is understood that the method 300 may be practiced with any other suitable systems, interfaces and components. In addition, while the method 300 and other methods described herein (including the method 400 to be presented later) may refer to STA's operating in accordance with IEEE 802.11, embodiments of those methods are not limited to just those STA's and may also be practiced on other mobile devices. Moreover, the method 300 and other methods described herein may be practiced by wireless devices configured to operate in other suitable types of wireless communication systems, including systems configured to operate according to 3GPP or various IEEE standards.

At operation 305 of the method 300, one or more traffic packets related to the establishment or re-establishment of the service may be received. Latency and data rate requirements for the service may be determined at operations 310 and 315, while a calibration overhead associated with the service or the STA may be determined at operation 320.

As previously described, a service operating at the STA may be characterized by requirements for parameters such as latency and data rate. Accordingly, the required latency may be determined in any suitable manner, including the use of the traffic packets received at operation 305. In some embodiments, the traffic packets may include the required latency explicitly as part of a bit field or similar within the traffic packets. In other embodiments, those traffic packets may include information, such as other parameters related to the service that may enable the required latency to be determined indirectly. As an example, a service type included in the traffic packets may be used as an index into a predetermined table containing approximate latencies for different service types, with the table stored on the STA. It should be noted that the value of the required latency may be specified in any suitable units, including seconds, milliseconds, microseconds or number of frames.

The required data rate may be determined in any suitable manner, including through the use of the traffic packets or any of the techniques previously described for determining required latency, including the use of a table containing data rates related to different service types. The required data rate may be specified in units such as bits/sec, Mbits/sec, Gbits/sec or any other suitable manner. The calibration overhead may also be determined in any suitable manner. As a non-limiting example, during a self-calibration process, the required time or amount of training data required may give an indication to the required calibration overhead.

It should be noted that the determinations performed in operations 310, 315, and 320 related to latency, data rate, and overhead may be performed sequentially, jointly or in any combination thereof, and may be performed in any order. As a non-limiting example, the required latency and data rate may be determined jointly when both quantities are explicitly included in the traffic packets, and the calibration overhead may be determined separately.

Referring back to the method 300 shown in FIG. 3, full-duplex may be chosen as the duplex mode at operation 325. Alternatively, TDD or FDD may be chosen as the duplex mode at operation 330. It should be mentioned again that some embodiments of the method 300 may not include all the operations shown in FIG. 3. For example, some embodiments may include either operation 325 or 330, but not both.

As previously described, the use of full-duplex may offer advantages over TDD or FDD in terms of latency and/or data rate, but may also introduce issues such as overhead, interference to neighboring devices, and negative impact on the battery level of the STA. The selection of full-duplex, TDD or FDD as the duplex mode may be based on one or more of these factors, and may be performed according to any number of embodiments.

Figure 4:
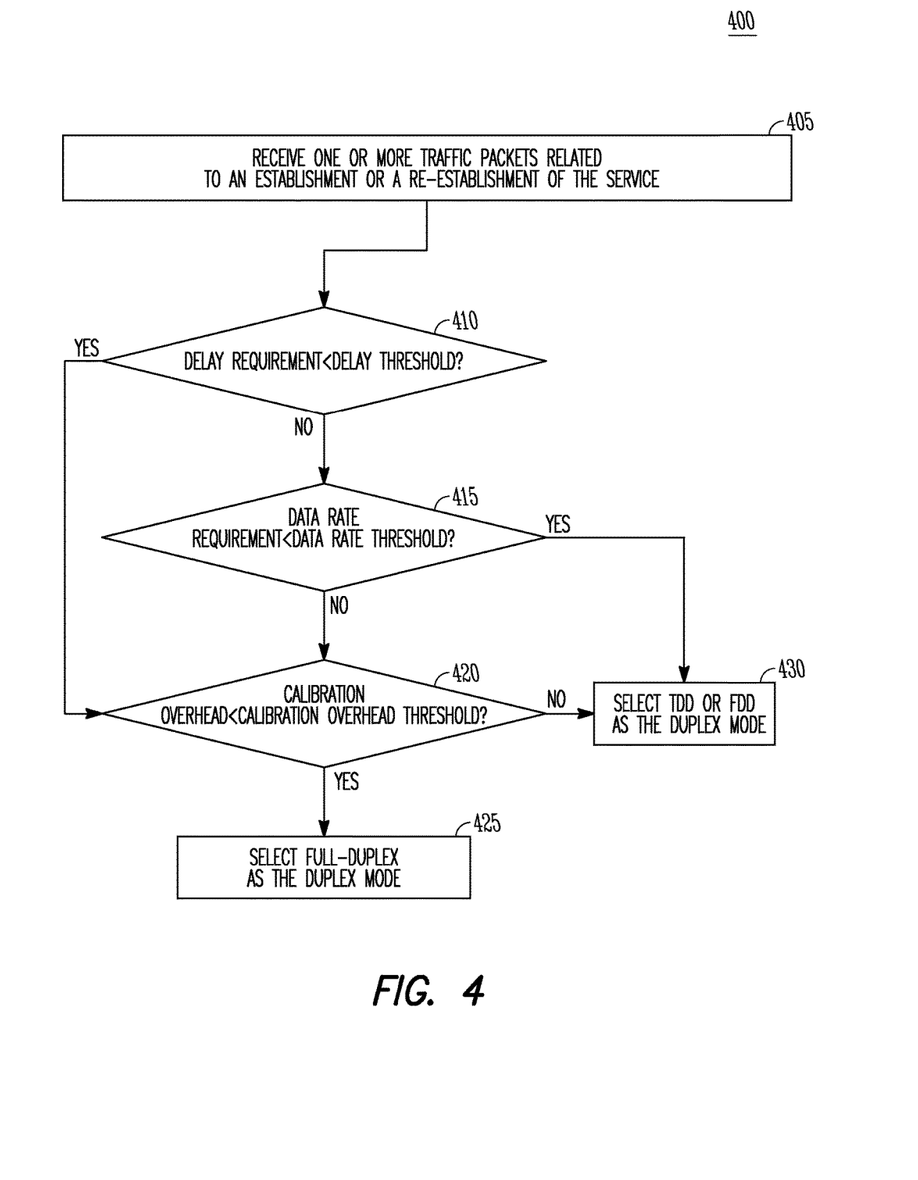
FIG. 4 illustrates the operation of another method for selecting a duplex mode in accordance with some embodiments.

Before the remaining operations of the method 300 are described, a non-limiting example of one such embodiment shown in FIG. 4 will be presented. It should be pointed out that similar embodiments may include some or all of the same operations shown in FIG. 4 or may utilize different control logic or a different flow than the method shown in FIG. 4. Throughout the description below related to the operations shown in FIG. 4, the delay, data rate, and calibration overhead thresholds may be predetermined as part of a system design or hardware analysis. While the example values of five milliseconds, 100 Mbits/sec, and 10% previously described for those thresholds may be used, the techniques described are not limited to those values, and any suitable values may be used.

At operation 405, one or more traffic packets can be received at the STA, and the packets may include information related to the establishment or re-establishment of a service. At operation 410, a delay requirement associated with the service may be compared to a predetermined delay threshold to determine if the service is low-latency, i.e. the delay requirement is less than the threshold. If so, the selection of full-duplex is desired for this low-latency service. However, the method first proceeds to operation 420 to check if the required calibration overhead for full-duplex is reasonable or not, which will be described shortly.

Returning to operation 410, if the delay requirement is not lower than the delay threshold, the service is not considered low-latency. The method then proceeds to operation 415, at which a required data rate of the service is compared with a data rate threshold. If the required data rate is not less than the data rate threshold, the service is considered high data rate, full-duplex mode is desired, and the method proceeds to operation 420 for the check related to calibration overhead. But if the required data rate is less than the data rate threshold, the method proceeds to operation 430, at which TDD or FDD is selected as the duplex mode. As a summary of this particular case, when the delay requirement is not less than the delay threshold and the data rate requirement is less than the data rate threshold, TDD or FDD is selected as the duplex mode. That is, when the service is neither low-latency nor high data rate, TDD or FDD may be considered sufficient.

Now operation 420 will be described, at which the required calibration overhead associated with full-duplex is compared to a calibration overhead threshold to determine if selection of full-duplex is reasonable. At this point, it should be noted that the service is either low-latency, high data rate, or both, and it is desired to select full-duplex as the duplex mode. In other words, the delay requirement is less than the delay threshold, the data rate requirement is not less than the data rate threshold, or both. If the calibration overhead is less than the calibration overhead threshold at operation 420, the use of full-duplex is considered reasonable and the method proceeds to operation 425, at which full-duplex is selected as the duplex mode. However, if the calibration overhead is too high (calibration overhead not less than the associated threshold), the method proceeds to operation 430, at which TDD or FDD is selected as the duplex mode.

It should be pointed out that in this embodiment and others described herein, comparison operations have generally resulted in two cases, less than or not less than (greater than or equal to). However, this has been done here only for simplicity of explanation and is not limiting. As such, comparison operations of these and other embodiments may utilize any suitable cases, including less than, not less than, equal to, greater than or not greater than.

Returning to the method 300 shown in FIG. 3, at operation 335, a full-duplex interference level associated with the service or the STA may be determined. A battery level associated with the STA may be determined at operation 340, and a full-duplex usage level associated with neighboring devices or the STA may be determined at operation 345. At operation 350, the selection of full-duplex as the duplex mode may be overridden and TDD or FDD may be selected as the duplex mode.

It should be noted that the operations 335-345 may serve as checks related to the service or the STA with the possible result of overriding the full-duplex selection at operation 350, but may also be performed for any other suitable purpose. As an example, values of the full-duplex usage level may be stored over a window of time to characterize or collect statistics on how often neighboring devices operate services that may require full-duplex. The operations 335-345 may be performed, in some embodiments, only in response to the selection of full-duplex as the duplex mode. However, in some embodiments, any or all of those operations may be performed before the duplex mode is selected (at operations 325 or 330), and may be utilized as part of that selection process. In addition, any or all of the operations 335-345 may be performed regardless of the duplex mode selection.

As previously described, a battery level associated with the STA, such as the remaining energy in the battery, may be determined in order to decide if the selection of full-duplex mode should be performed or overridden. If the battery level is below a predetermined battery level threshold, it may be appropriate to use TDD or FDD instead of full-duplex for the service, and one of those modes may be selected.

A full-duplex interference level associated with the service or the STA may also be determined. As previously described, the interference level may include information about interference levels that may be caused by a full-duplex link at the STA to other devices operating in close proximity to, or at least within range of, the STA. If it is determined that the use of full-duplex mode at the STA may cause an unreasonable amount of interference to any of those other devices or other sessions operating at the STA (i.e. the full-duplex interference level is not less than a predetermined full-duplex interference threshold), TDD or FDD may be selected as the duplex mode or the selection of full-duplex mode for the service may be overridden.

A full-duplex usage level associated with neighboring devices or the STA may also be determined and used as part of the decision to select full-duplex or to override such a selection. In some cases, particularly those in which the STA has multiple communication sessions in operation or multiple other devices are operating in close proximity, it may be beneficial that the STA and the other devices communicate between each other, or to an AP or other controlling node or device, about their own usage of full-duplex. The communication may be related to current connections or sessions employing full-duplex or related to planned or possible future connections that may be low-latency or high data rate. The full-duplex usage level and a related full-duplex usage threshold may reflect this information in any suitable manner, such as the number of full-duplex connections currently active, or whether that number is significant or not.

Accordingly, the full-duplex usage level may be compared to the full-duplex usage threshold to decide if the selection of full-duplex mode for the service should be performed or overridden. That is, if many devices in close proximity to the STA are planning to use, or may use, full-duplex, the STA may choose to override its own use of full-duplex in the best interest of those other devices. In particular, when the devices are all part of the same system, such cooperation may be easier to facilitate.

It should be noted that in these embodiments and others, the overriding of full-duplex may occur before, during or after its selection or use. As an example, the battery level may be above the threshold when the full-duplex mode is first used, and may fall over time to a level below the threshold. In response to the level falling below the threshold, the use of full-duplex may be overridden. As another example, the full-duplex interference level or full-duplex usage level may start below their respective thresholds when full-duplex is first used, and increase over time. In those cases, the STA is providing more interference to other devices or there are more full-duplex connections on those devices, and the STA may choose to discontinue full-duplex operation in the best interest of those devices.

It should be further noted that the overriding of full-duplex mode is not limited to occurring just in response to, or as a result of, the above checks (operations 335-345). In some embodiments, overriding of full-duplex mode may occur in response to any appropriate checks, events or results, which may also include any or all of the checks in operations 335-345. In some embodiments, overriding of full-duplex mode may be performed for any reason, and may not be in response to any check, event or result like mentioned above.

Returning once again to the method 300 shown in FIG. 3, at operation 355 a message related to the selection of the duplex mode may be transmitted from the STA. The message may be receivable by other STA's or by 802.11 access points (AP) and may announce the selection of full-duplex for one or more services operating at the STA. In some embodiments, the message may include other information, such as information that may have resulted from comparisons or determinations previously described. For example, the full-duplex interference level may provide useful information to those other STA's or AP's. As another example, the message may include the frequency ranges over which the full-duplex interference may occur.

In addition, the message may include requests to the other STA's or AP's. As previously mentioned, the successful operation of full-duplex may be challenging in some cases, such as when there is a significant amount of self interference. In those cases, interference from other devices that reaches the STA may actually degrade the performance of the service while in full-duplex mode, perhaps to the point that it cannot function. In some embodiments, therefore, the message transmitted from the STA may include one or more requests to other devices (STA's or AP's) to reduce or monitor their transmit power. Such a feature may be of particular interest in a system in which several STA's and AP's are working cooperatively. The devices in such a system may be configured to respect the needs of other devices to sometimes employ full-duplex for a service that requires it.

A mobile device is disclosed herein. The mobile device may be configured to operate in an IEEE 802.11 or 3GPP network or in an evolution of an IEEE 802.11 or 3GPP network. The mobile device may be further configured to operate in accordance with a duplex mode. The mobile device may comprise hardware processing circuitry configured to receive one or more traffic packets related to an establishment or a re-establishment of a service at the mobile device. The hardware processing circuitry may be further configured to, when a delay requirement associated with the service is less than a predetermined delay threshold, select full-duplex as the duplex mode when a calibration overhead associated with the mobile device or the service is less than a predetermined calibration overhead threshold and select time-division duplex (TDD) or frequency-division duplex (FDD) as the duplex mode when the calibration overhead is not less than the calibration overhead threshold. The hardware processing circuitry may be further configured to, when the delay requirement is not less than the delay threshold and a data rate requirement associated with the service is less than a predetermined data rate threshold, select TDD or FDD as the duplex mode. The hardware processing circuitry may be further configured to, when the delay requirement is not less than the delay threshold and the data rate requirement is not less than the data rate threshold, select full-duplex as the duplex mode when the calibration overhead is less than the calibration overhead threshold and select TDD or FDD as the duplex mode when the calibration overhead is not less than the calibration overhead threshold.

The hardware processing circuitry may be further configured to, in response to any of the selections of full-duplex as the duplex mode, override the selection of full-duplex as the duplex mode and select TDD or FDD as the duplex mode when a full-duplex interference level associated with the mobile device or the service is not less than a predetermined full-duplex interference threshold. The hardware processing circuitry may be further configured to, in response to any of the selections of full-duplex as the duplex mode, override the selection of full-duplex as the duplex mode and select TDD or FDD as the duplex mode when a battery level associated with the mobile device is less than a predetermined battery level threshold. The hardware processing circuitry may be further configured to, in response to any of the selections of full-duplex as the duplex mode, override the selection of full-duplex as the duplex mode and select TDD or FDD as the duplex mode when a full-duplex usage level associated with the mobile device or other mobile devices is less than a predetermined full-duplex usage threshold. The hardware processing circuitry may be further configured to transmit, in response to the selection of full-duplex as the duplex mode, a message that is receivable by other mobile devices or base stations and that comprises information related to the selection of full-duplex as the duplex mode or a request that at least one of the other mobile devices or base stations reduce or monitor its transmit power.

In some embodiments of the mobile device, the delay requirement and the data rate requirement may be at least partially determined from the traffic packets. In some embodiments of the mobile device, the delay requirement and delay threshold may refer to round-trip delays and the delay threshold may be five milliseconds or less.

A method of selecting a duplex mode for a service operating on a mobile device configured to operate in an IEEE 802.11 or 3GPP network or in an evolution of an IEEE 802.11 or 3GPP network is also disclosed herein. The method may include receiving one or more traffic packets related to an establishment or a re-establishment of the service at the mobile device. The method may also include selecting a duplex mode for the service. As part of selecting the duplex mode, when a delay requirement associated with the service is less than a predetermined delay threshold, the mobile device may be configured to select full-duplex as the duplex mode when a calibration overhead associated with the mobile device or the service is less than a predetermined calibration overhead threshold and to select time-division duplex (TDD) or frequency-division duplex (FDD) as the duplex mode when the calibration overhead is not less than the calibration overhead threshold. As part of selecting the duplex mode, when the delay requirement is not less than the delay threshold and a data rate requirement associated with the service is less than a predetermined data rate threshold, the mobile device may be configured to select TDD or FDD as the duplex mode. As part of selecting the duplex mode, when the delay requirement is not less than the delay threshold and the data rate requirement is not less than the data rate threshold, the mobile device may be configured to select full-duplex as the duplex mode when the calibration overhead is less than the calibration overhead threshold and to select TDD or FDD as the duplex mode when the calibration overhead is not less than the calibration overhead threshold.

The method may also include, in response to any of the selections of full-duplex as the duplex mode, overriding the selection of full-duplex as the duplex mode and selecting TDD or FDD as the duplex mode when a full-duplex interference level associated with the mobile device or the service is not less than a predetermined full-duplex interference threshold. The method may also include, in response to any of the selections of full-duplex as the duplex mode, overriding the selection of full-duplex as the duplex mode and selecting TDD or FDD as the duplex mode when a battery level associated with the mobile device is less than a predetermined battery level threshold. The method may also include, in response to any of the selections of full-duplex as the duplex mode, overriding the selection of full-duplex as the duplex mode and selecting TDD or FDD as the duplex mode when a full-duplex usage level associated with the mobile device or other mobile devices is less than a predetermined full-duplex usage threshold.

The method may include transmitting, in response to the selection of full-duplex as the duplex mode, a message that is receivable by other mobile devices or base stations and that comprises information related to the selection of full-duplex as the duplex mode or a request that at least one of the other mobile devices or base stations reduce or monitor its transmit power. In some embodiments, the delay requirement and the data rate requirement may be at least partially determined from the traffic packets. In some embodiments, the delay requirement and delay threshold may refer to round-trip delays and the delay threshold may be five milliseconds or less.

A non-transitory computer-readable storage medium that may store instructions for execution by one or more processors to perform operations is also disclosed herein. The operations may include receiving one or more traffic packets related to an establishment or a re-establishment of a service at a mobile device configured to operate in an IEEE 802.11 or 3GPP network or in an evolution of an IEEE 802.11 or 3GPP network. The operations may also include selecting a duplex mode for the service. Selecting the duplex mode may include, when a delay requirement associated with the service is less than a predetermined delay threshold, selecting full-duplex as the duplex mode when a calibration overhead associated with the mobile device or the service is less than a predetermined calibration overhead threshold and selecting time-division duplex (TDD) or frequency-division duplex (FDD) as the duplex mode when the calibration overhead is not less than the calibration overhead threshold. Selecting the duplex mode may also include selecting TDD or FDD as the duplex mode when the delay requirement is not less than the delay threshold and a data rate requirement associated with the service is less than a predetermined data rate threshold. Selecting the duplex mode may also include, when the delay requirement is not less than the delay threshold and the data rate requirement is not less than the data rate threshold, selecting full-duplex as the duplex mode when the calibration overhead is less than the calibration overhead threshold and selecting TDD or FDD as the duplex mode when the calibration overhead is not less than the calibration overhead threshold.

The operations may also include, in response to any of the selections of full-duplex as the duplex mode, overriding the selection of full-duplex as the duplex mode and selecting TDD or FDD as the duplex mode when a full-duplex interference level associated with the mobile device or the service is not less than a predetermined full-duplex interference threshold. The operations may also include, in response to any of the selections of full-duplex as the duplex mode, overriding the selection of full-duplex as the duplex mode and selecting TDD or FDD as the duplex mode when a battery level associated with the mobile device is less than a predetermined battery level threshold. The operations may also include, in response to any of the selections of full-duplex as the duplex mode, overriding the selection of full-duplex as the duplex mode and selecting TDD or FDD as the duplex mode when a full-duplex usage level associated with the mobile device or other mobile devices is less than a predetermined full-duplex usage threshold.

The operations may also include transmitting, in response to the selection of full-duplex as the duplex mode, a message that is receivable by other mobile devices or base stations and that comprises information related to the selection of full-duplex as the duplex mode or a request that at least one of the other mobile devices or base stations reduce or monitor its transmit power. In some embodiments, the delay requirement and the data rate requirement may be at least partially determined from the traffic packets. In some embodiments, the delay requirement and delay threshold may refer to round-trip delays and the delay threshold may be five milliseconds or less.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a mobile device configured to operate in accordance with a duplex mode, the mobile device comprising: memory; and hardware processing circuitry coupled to the memory, the hardware processing circuitry configured to:
receive one or more traffic packets related to an establishment or a re-establishment of a service at the mobile device; and
when a delay requirement associated with the service is less than a predetermined delay threshold:
select full-duplex as the duplex mode when a calibration overhead associated with the mobile device or the service is less than a predetermined calibration overhead threshold, the calibration overhead based on a self-calibration to be performed by the mobile device to use full-duplex mode; and
select time-division duplex (TDD) or frequency-division duplex (FDD) as the duplex mode when the calibration overhead is not less than the calibration overhead threshold.

2. The apparatus according to claim 1, the hardware processing circuitry further configured to, when the delay requirement is not less than the delay threshold and a data rate requirement associated with the service is less than a predetermined data rate threshold, select TDD or FDD as the duplex mode.

3. The apparatus to claim 2, the hardware processing circuitry further configured to, when the delay requirement is not less than the delay threshold and the data rate requirement is not less than the data rate threshold:
select full-duplex as the duplex mode when the calibration overhead is less than the calibration overhead threshold; and
select TDD or FDD as the duplex mode when the calibration overhead is not less than the calibration overhead threshold.

4. The apparatus to claim 3, the hardware processing circuitry further configured to, in response to any of the selections of full-duplex as the duplex mode, override the selection of full-duplex as the duplex mode and select TDD or FDD as the duplex mode when a full-duplex interference level associated with the mobile device or the service is not less than a predetermined full-duplex interference threshold.

5. The apparatus to claim 3, the hardware processing circuitry further configured to, in response to any of the selections of full-duplex as the duplex mode, override the selection of full-duplex as the duplex mode and select TDD or FDD as the duplex mode when a battery level associated with the mobile device is less than a predetermined battery level threshold.

6. The apparatus to claim 3, the hardware processing circuitry further configured to, in response to any of the selections of full-duplex as the duplex mode, override the selection of full-duplex as the duplex mode and select TDD or FDD as the duplex mode when a full-duplex usage level associated with the mobile device or other mobile devices is less than a predetermined full-duplex usage threshold.

7. The apparatus to claim 3, the hardware processing circuitry further configured to transmit, in response to the selection of full-duplex as the duplex mode, a message that is receivable by other mobile devices or base stations and that comprises information related to the selection of full-duplex as the duplex mode or a request that at least one of the other mobile devices or base stations reduce or monitor its transmit power.

8. The apparatus to claim 3, wherein the delay requirement and the data rate requirement are at least partially determined from the traffic packets, and wherein the mobile device is configured to operate in an IEEE 802.11 or 3GPP network or in an evolution of an IEEE 802.11 or 3GPP network.

9. The apparatus to claim 1, wherein the delay requirement and delay threshold refer to round-trip delays and the delay threshold is five milliseconds or less.

10. A method of selecting a duplex mode for a service operating on a mobile device performed by an apparatus of the mobile device, the method comprising:
receiving one or more traffic packets related to an establishment or a re-establishment of the service at the mobile device; and
selecting a duplex mode for the service;
wherein when a delay requirement associated with the service is less than a predetermined delay threshold,
selecting full-duplex as the duplex mode when a calibration overhead associated with the mobile device or the service is less than a predetermined calibration overhead threshold, the calibration overhead based on a self-calibration to be performed by the mobile device to use full-duplex mode; and
selecting time-division duplex (TDD) or frequency-division duplex (FDD) as the duplex mode when the calibration overhead is not less than the calibration overhead threshold.

11. The method according to claim 10, the method further comprising:
when the delay requirement is not less than the delay threshold and a data rate requirement associated with the service is less than a predetermined data rate threshold, selecting TDD or FDD as the duplex mode.

12. The method according to claim 11, the method further comprising:
when the delay requirement is not less than the delay threshold and the data rate requirement is not less than the data rate threshold,
selecting full-duplex as the duplex mode when the calibration overhead is less than the calibration overhead threshold; and
selecting TDD or FDD as the duplex mode when the calibration overhead is not less than the calibration overhead threshold.

13. The method according to claim 12, further comprising, in response to any of the selections of full-duplex as the duplex mode, overriding the selection of full-duplex as the duplex mode and selecting TDD or FDD as the duplex mode when a full-duplex interference level associated with the mobile device or the service is not less than a predetermined full-duplex interference threshold.

14. The method according to claim 12, further comprising, in response to any of the selections of full-duplex as the duplex mode, overriding the selection of full-duplex as the duplex mode and selecting TDD or FDD as the duplex mode when a battery level associated with the mobile device is less than a predetermined battery level threshold.

15. The method according to claim 12, further comprising, in response to any of the selections of full-duplex as the duplex mode, overriding the selection of full-duplex as the duplex mode and selecting TDD or FDD as the duplex mode when a full-duplex usage level associated with the mobile device or other mobile devices is less than a predetermined full-duplex usage threshold.

16. The method according to claim 12, further comprising transmitting, in response to the selection of full-duplex as the duplex mode, a message that is receivable by other mobile devices or base stations and that comprises information related to the selection of full-duplex as the duplex mode or a request that at least one of the other mobile devices or base stations reduce or monitor its transmit power.

17. The method according to claim 12, wherein the delay requirement and the data rate requirement are at least partially determined from the traffic packets.

18. The method according to claim 12, wherein the delay requirement and delay threshold refer to round-trip delays and the delay threshold is five milliseconds or less.

19. The method of claim 12 wherein the mobile device is configured to operate in an IEEE 802.11 or 3GPP network or in an evolution of an IEEE 802.11 or 3GPP network.

20. A non-transitory computer-readable storage medium that stores instructions for execution by one or more processors to perform operations comprising:
receiving one or more traffic packets related to an establishment or a re-establishment of a service at a mobile device; and
selecting a duplex mode for the service; wherein selecting the duplex mode comprises, when a delay requirement associated with the service is less than a predetermined delay threshold:
selecting full-duplex as the duplex mode when a calibration overhead associated with the mobile device or the service is less than a predetermined calibration overhead threshold, the calibration overhead based on a self-calibration to be performed by the mobile device to use full-duplex mode; and
selecting time-division duplex (TDD) or frequency-division duplex (FDD) as the duplex mode when the calibration overhead is not less than the calibration overhead threshold.

21. The non-transitory computer-readable storage medium according to claim 20, wherein selecting the duplex mode further comprises selecting TDD or FDD as the duplex mode when the delay requirement is not less than the delay threshold and a data rate requirement associated with the service is less than a predetermined data rate threshold.

22. The non-transitory computer-readable storage medium according to claim 21, wherein selecting the duplex mode further comprises:
when the delay requirement is not less than the delay threshold and the data rate requirement is not less than the data rate threshold:
selecting full-duplex as the duplex mode when the calibration overhead is less than the calibration overhead threshold; and
selecting TDD or FDD as the duplex mode when the calibration overhead is not less than the calibration overhead threshold.

23. The non-transitory computer-readable storage medium according to claim 22, the operations further comprising, in response to any of the selections of full-duplex as the duplex mode, overriding the selection of full-duplex as the duplex mode and selecting TDD or FDD as the duplex mode when a full-duplex interference level associated with the mobile device or the service is not less than a predetermined full-duplex interference threshold.

24. The non-transitory computer-readable storage medium according to claim 22, the operations further comprising, in response to any of the selections of full-duplex as the duplex mode, overriding the selection of full-duplex as the duplex mode and selecting TDD or FDD as the duplex mode when a battery level associated with the mobile device is less than a predetermined battery level threshold, and wherein the mobile device is configured to operate in an IEEE 802.11 or 3GPP network or in an evolution of an IEEE 802.11 or 3GPP network.

25. The non-transitory computer-readable storage medium according to claim 22, the operations further comprising, in response to any of the selections of full-duplex as the duplex mode, overriding the selection of full-duplex as the duplex mode and selecting TDD or FDD as the duplex mode when a full-duplex usage level associated with the mobile device or other mobile devices is less than a predetermined full-duplex usage threshold.

26. The non-transitory computer-readable storage medium according to claim 22, the operations further comprising transmitting, in response to the selection of full-duplex as the duplex mode, a message that is receivable by other mobile devices or base stations and that comprises information related to the selection of full-duplex as the duplex mode or a request that at least one of the other mobile devices or base stations reduce or monitor its transmit power.

27. The non-transitory computer-readable storage medium according to claim 22, wherein the delay requirement and the data rate requirement are at least partially determined from the traffic packets.

28. The non-transitory computer-readable storage medium according to claim 22, wherein the delay requirement and delay threshold refer to round-trip delays and the delay threshold is five milliseconds or less.

29. The apparatus of claim 1, wherein the self-calibration to be performed by the mobile device determines parameters for a cancellation or mitigation of self-interference in one or both of a transmitter chain or a receiver chain.

* * * * *